US011946021B2

(12) United States Patent
Matza et al.

(10) Patent No.: US 11,946,021 B2
(45) Date of Patent: Apr. 2, 2024

(54) SOLVENT COMPOSITION AND PROCESS FOR REMOVAL OF ASPHALT AND OTHER CONTAMINANT MATERIALS

(71) Applicant: United Laboratories International, LLC, Houston, TX (US)

(72) Inventors: Stephen D. Matza, Sugarland, TX (US); Dana M. Archuleta, Pearland, TX (US)

(73) Assignee: United Laboratories International, LLC, Houston, TX (US)

( * ) Notice: Subject to any disclaimer, the term of this patent is extended or adjusted under 35 U.S.C. 154(b) by 0 days.

(21) Appl. No.: 15/198,597

(22) Filed: Jun. 30, 2016

(65) Prior Publication Data

US 2016/0312160 A1 Oct. 27, 2016

Related U.S. Application Data

(63) Continuation-in-part of application No. 14/580,698, filed on Dec. 23, 2014.

(Continued)

(51) Int. Cl.
*B08B 3/08* (2006.01)
*B08B 3/10* (2006.01)

(Continued)

(52) U.S. Cl.
CPC ............ *C11D 11/0041* (2013.01); *C11D 1/58* (2013.01); *C11D 1/62* (2013.01); *C11D 3/2003* (2013.01);

(Continued)

(58) Field of Classification Search
CPC ........... C11D 1/58; C11D 1/62; C11D 3/2003; C11D 3/2041; C11D 3/3445; C11D 3/28; C11D 3/30

(Continued)

(56) References Cited

U.S. PATENT DOCUMENTS 3,813,343 A * 5/1974 Mukai et al. ........ C11D 3/0057 134/40
3,993,555 A 11/1976 Park et al.

(Continued)

FOREIGN PATENT DOCUMENTS

AU 2015236386 11/2016
CA 2821052 6/2012

(Continued)

OTHER PUBLICATIONS

Valhoma Corporation, DMSO Industrial Grade—A Technical Grade for Basic Applications, p. 1-2, Feb. 2015.*

(Continued)

*Primary Examiner* — Gregory R Delcotto
(74) *Attorney, Agent, or Firm* — Conley Rose, P.C.

(57) ABSTRACT

A method and composition for removing contaminant material from industrial equipment are disclosed herein. The method includes providing a solvent composition having methyl soyate, an aprotic solvent such as dimethyl sulfoxide, an additional solvent, and a cationic surfactant. The method also includes contacting the contaminant material with the solvent composition and allowing the solvent composition to react with the contaminant material such that at least a portion of the contaminant material is no longer attached to the industrial equipment.

11 Claims, 1 Drawing Sheet

Related U.S. Application Data

(60) Provisional application No. 61/969,125, filed on Mar. 22, 2014.

(51) Int. Cl.

| | |
|---|---|
| ***C11D 1/38*** | (2006.01) |
| ***C11D 1/58*** | (2006.01) |
| ***C11D 1/62*** | (2006.01) |
| ***C11D 3/18*** | (2006.01) |
| ***C11D 3/20*** | (2006.01) |
| ***C11D 3/28*** | (2006.01) |
| ***C11D 3/30*** | (2006.01) |
| ***C11D 3/34*** | (2006.01) |
| ***C11D 3/43*** | (2006.01) |
| ***C11D 11/00*** | (2006.01) |

(52) U.S. Cl.
CPC .......... *C11D 3/2041* (2013.01); *C11D 3/2093* (2013.01); *C11D 3/28* (2013.01); *C11D 3/30* (2013.01); *C11D 3/3445* (2013.01); *C11D 3/43* (2013.01)

(58) Field of Classification Search
USPC ....... 510/237, 238, 475, 500, 504, 505, 506, 510/433
See application file for complete search history.

(56) References Cited

U.S. PATENT DOCUMENTS

| | | | | |
|---|---|---|---|---|
| 4,046,668 | A | 9/1977 | Farcasiu et al. | |
| 4,347,118 | A | 8/1982 | Funk et al. | |
| 5,225,002 | A | 7/1993 | Stafford et al. | |
| 5,562,816 | A | 10/1996 | Roling | |
| 6,117,830 | A | 9/2000 | Yokosuka et al. | |
| 6,191,087 | B1 | 2/2001 | Opre et al. | |
| 6,281,189 | B1 | 8/2001 | Heimann et al. | |
| 6,369,016 | B1 * | 4/2002 | Vlasblom | C11D 1/83 510/365 |
| 6,689,734 | B2 * | 2/2004 | Doyel | C11D 7/261 134/38 |
| 6,833,345 | B2 * | 12/2004 | Machac, Jr. | C09D 9/00 134/38 |
| 7,060,301 | B2 * | 6/2006 | Wei | A01N 37/16 422/29 |
| 7,288,511 | B2 * | 10/2007 | Doyel | C11D 7/5018 510/177 |
| 7,462,582 | B2 * | 12/2008 | Komiyama | C10M 141/00 508/136 |
| 7,462,587 | B2 | 12/2008 | Shah et al. | |
| 7,547,672 | B2 * | 6/2009 | Zaki | C11D 1/667 510/245 |
| 8,287,658 | B2 | 10/2012 | Miralles et al. | |
| 8,481,474 | B1 * | 7/2013 | Blattner | C11D 7/3245 510/235 |
| 8,716,207 | B2 * | 5/2014 | Blattner | C11D 3/3707 134/2 |
| 8,951,951 | B2 * | 2/2015 | Zaki | C11D 3/28 510/188 |
| 2000/6096699 | | 1/2000 | Bergemann et al. | |
| 2002/0111284 | A1 | 8/2002 | Machac | |
| 2003/0083220 | A1 * | 5/2003 | Doyel | C11D 7/261 510/412 |
| 2003/0119686 | A1 | 6/2003 | Machac et al. | |
| 2003/0130153 | A1 | 7/2003 | Foley et al. | |
| 2003/0228996 | A1 * | 12/2003 | Hei | A01N 25/02 510/382 |
| 2004/0224861 | A1 | 11/2004 | Fuiji | |
| 2004/0224870 | A1 | 11/2004 | Doyel | |
| 2005/0096245 | A1 * | 5/2005 | Hei | A01N 25/02 510/383 |
| 2005/0197267 | A1 * | 9/2005 | Zaki | C11D 7/266 510/245 |
| 2005/0245412 | A1 | 11/2005 | Shah et al. | |
| 2006/0079423 | A1 * | 4/2006 | Zaki | C11D 1/667 510/177 |
| 2008/0070820 | A1 * | 3/2008 | Mullen | C11D 7/06 510/253 |
| 2008/0139418 | A1 | 6/2008 | Cioletti et al. | |
| 2008/0139437 | A1 * | 6/2008 | Power | C09D 9/005 510/208 |
| 2008/0261856 | A1 * | 10/2008 | Nakagawa | C11D 3/3769 510/421 |
| 2008/0287331 | A1 | 11/2008 | Lin et al. | |
| 2009/0124524 | A1 | 5/2009 | Minor et al. | |
| 2009/0124525 | A1 | 5/2009 | Futterer et al. | |
| 2009/0197793 | A1 | 8/2009 | Inoue | |
| 2009/0233838 | A1 * | 9/2009 | Zaki | C11D 1/667 510/365 |
| 2009/0281012 | A1 * | 11/2009 | Trivedi | C08G 65/3314 510/138 |
| 2010/0081596 | A1 | 4/2010 | Rong et al. | |
| 2010/0273695 | A1 * | 10/2010 | Sehgal | C08G 65/3314 510/174 |
| 2010/0314117 | A1 | 12/2010 | Li et al. | |
| 2011/0166054 | A1 | 7/2011 | Crawford et al. | |
| 2011/0190187 | A1 * | 8/2011 | Hawes, III | C09D 9/00 510/174 |
| 2011/0265830 | A1 * | 11/2011 | Gonzalez | B08B 9/00 134/26 |
| 2011/0319312 | A1 * | 12/2011 | Schwerter | C11D 1/123 510/480 |
| 2012/0040880 | A1 | 2/2012 | Rieth et al. | |
| 2012/0213759 | A1 | 8/2012 | Karsten et al. | |
| 2012/0232170 | A1 * | 9/2012 | Klinkhammer | C11D 3/18 514/789 |
| 2013/0157920 | A1 * | 6/2013 | Sanchez | C11D 1/18 510/365 |
| 2015/0252310 | A1 * | 9/2015 | Blattner | C11D 3/43 510/235 |
| 2015/0267152 | A1 * | 9/2015 | Matza | C11D 11/0041 510/366 |
| 2016/0312160 | A1 | 10/2016 | Matza | |

FOREIGN PATENT DOCUMENTS

| | | |
|---|---|---|
| CA | 2943490 | 10/2015 |
| CN | 172984 | 2/2006 |
| DK | 3122862 | 8/2019 |
| EA | 023408 | 6/2016 |
| ES | 2739530 | 1/2020 |
| JP | 2003519248 | 6/2003 |
| JP | 2013539487 | 10/2013 |
| KR | 20190026781 | 3/2019 |
| PL | 3122862 | 10/2019 |
| WO | 1998010033 | 3/1998 |
| WO | 2005108536 | 11/2005 |
| WO | 2010146514 | 12/2010 |
| WO | 2015148396 | 10/2015 |
| WO | 2015168658 | 11/2015 |

OTHER PUBLICATIONS

International Search Report and the Written Opinion of International Application No. PCT/US 15/22051 dated Jul. 2, 2015.
USPTO Office Action for U.S. Appl. No. 14/580,698 dated Apr. 7, 2016.
USPTO Final Office Action for U.S. Appl. No. 14/580,698 dated Oct. 24, 2016.
Extended European Search Report for Application No. 15769505.7 dated Aug. 31, 2017.
Australian Examination Report for Application No. 2015236386 dated Feb. 20, 2018.
International Preliminary Report On Patentability for Application No. PCT/US2017/040073, dated Jan. 10, 2019.
USPTO Office Action for U.S. Appl. No. 14/580,698, dated Nov. 16, 2018.
Summary of Data for Chemical Selection—Methyl Soyate, 67784-80-9, p. 1-19, Oct. 2010.

(56) References Cited

OTHER PUBLICATIONS

Cargill—Biodiesel Material Safety Data Sheet, p. 1-3, Oct. 2005.
CHS—Material Safety Data Sheet, Methyl Soyate, p. 1-4, Apr. 2008.
Kazakhstan Office Action and English translation for Application No. 2019/0075.1 dated Feb. 26, 2020.
Gaylord, "Although Is DMSO safer to use than NMP? How do their physical properties compare?" [Online], Nov. 1, 2015 [retrieved on Jan. 28, 2020]. Retrieved from the Internet: URL:https://www.gaylordchemical.com/wp-content/uploads/2015/11/NMP-vs-DMSO-brochure.pdf.
Extended European Report for Application No. 17821281.7 dated Feb. 4, 2020.
Indian Office Action for Application No. 201617032287 dated Aug. 13, 2019.
USPTO Non-Final Office Action for U.S. Appl. No. 14/580,698 dated Sep. 25, 2019.
European Search Report for Application No. 19154867.6 dated May 28, 2019.
Chilean Office Action and English Translation for Application No. 201803898 dated Oct. 15, 2019.
Saudi Arabia Examination Report and English Translation for Application No. 516371873 dated Jan. 20, 2019.
Australian Examination Report for Application No. 2019201197 dated Aug. 6, 2019.
Indian Examination Report for Application No. 201917003627 dated Jul. 14, 2020.
USPTO Non-Final Office Action for U.S. Appl. No. 14/580,698 dated Sep. 9, 2020.
Saudi Arabia Office Action and English Translation for Application No. dated May 7, 2020.
Indonesian Office Action and English Translation for Application No. P00201900751 dated Oct. 26, 2020.
Australia Patent Examination Report No. 1 for Application No. 2017290352 dated Nov. 30, 2020.
USPTO Office Action for U.S. Appl. No. 14/580,698 dated Sep. 9, 2020.
Kazakhstan Office Action and Translation for Application No. 2021/003.1 dated May 1, 2021.
Colombian Examination and English Translation for Application No. NC2019/0000948 dated Nov. 23, 2020.
Australian Examination Report for Application No. 2017290352 dated Nov. 30, 2020.
Canadian Examination Report for Application No. 2,943,490 dated Apr. 19, 2021.
Colombian Examination Report for Application No. NC2019/0000948 dated May 7, 2021.
Japanese Office Action and Partial English Translation for IP No. 2018-328 dated Jun. 15, 2021.
Saudi Arabian Substantive Examination Report for Application No. 518400779 dated Jul. 3, 2021.
Brazilian Office Action and English Translation for Application No. BR112019000036-4 dated Jun. 29, 2017.
Kazakstan Office Action for Application No. 20190020 dated Sep. 16, 2021.
Saudi Arabian Substantive Examination Report and Translation for Application No. 518400779 dated Oct. 26, 2021.
Korean Examination Report for Application No. 10-2019-7002271 dated Sep. 5, 2021.

* cited by examiner

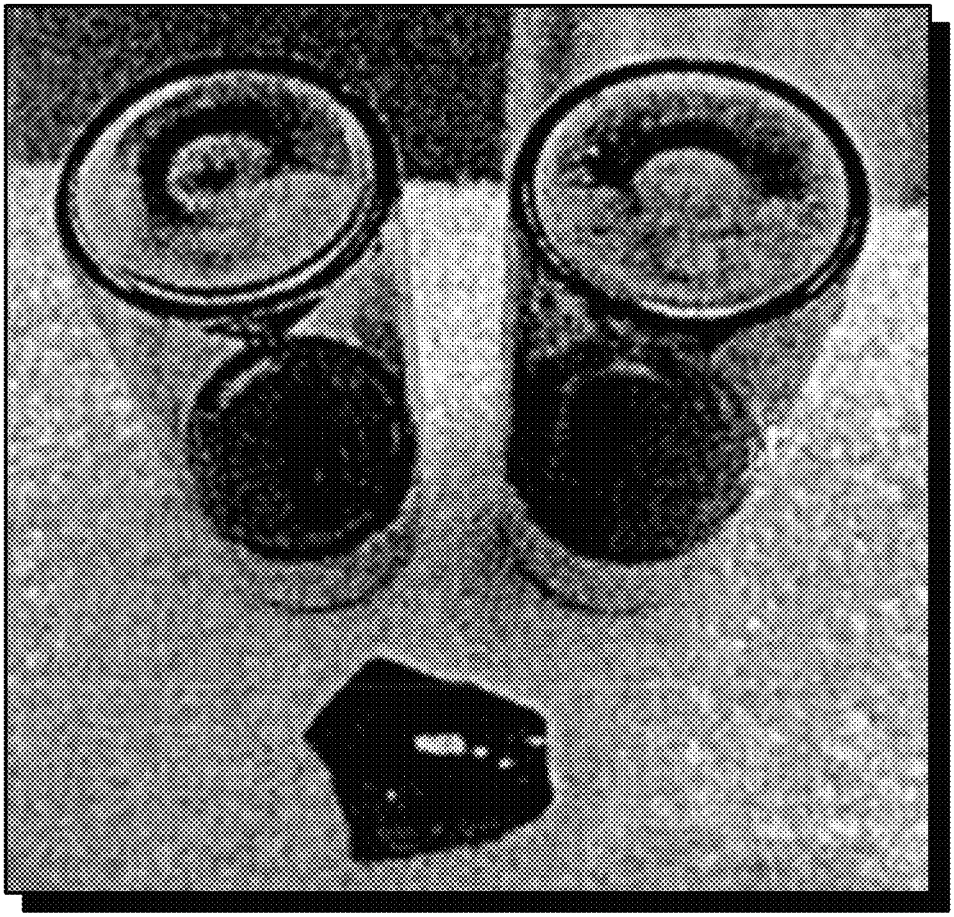

SOLVENT COMPOSITION AND PROCESS FOR REMOVAL OF ASPHALT AND OTHER CONTAMINANT MATERIALS

CROSS-REFERENCE TO RELATED APPLICATIONS

This is a continuation-in-part application of U.S. patent application Ser. No. 14/580,698 filed on Dec. 23, 2014, titled "Solvent Composition and Process for Removal of Asphalt and Other Contaminant Materials", which application claims priority to U.S. Provisional Patent Application No. 61/969,125, filed on Mar. 22, 2014, titled "Solvent Composition and Process for Removal of Asphalt and Other Contaminant Materials," the entire disclosures of which are herein incorporated by reference in their entireties.

BACKGROUND OF THE INVENTION

1. Field of the Invention

This invention relates to the field of industrial facility cleanup and more specifically to the disaggregation and subsequent removal of asphalt and other contaminant materials from industrial equipment.

2. Background of the Invention

During the refinement process of crude oil or natural gas, contaminant materials such as asphalt, heavy asphaltenic materials, hydrogen-deficient carbonaceous materials, coke, tar, and the like may be produced as byproducts. These contaminant materials may contaminate vessels, tanks, or other types of industrial equipment. The contamination of industrial equipment may lead to problems such as increased downtime or poor processing results.

Numerous approaches to cleaning and decontaminating industrial equipment have been developed. For example, chemical approaches such as citrus-derived water products, water-based products, low boiling petroleum fractions (e.g., naphtha, gasoline, benzene, etc.), turpentine, as well as physical approaches such as freezing and scraping, have all been used to remove contaminant materials with varying degrees of success.

Such conventional approaches may provide various drawbacks. For instance, citrus-derived water products may form emulsions and thus may require emulsion breakers. Water-based products may require extensive separatory effort if any of the hydrocarbons are to be recovered for recycling processes. Additionally, some water-based products may also require a solvent pretreatment to initiate the dissolution of the contaminant materials. Petroleum fractions may be highly flammable and also not easily rinsable with water. Freezing and scraping methods may require additional workers and may only be used in vessels that are accessible to and are safe for those workers. Finally, many of these same approaches are not biodegradable. The lack of biodegradability limits not only the applications for which an approach may be used, but also the operation sites in which it may be used.

Consequently, there is a need for a new solvent composition and process for the removal of contaminant materials.

BRIEF SUMMARY OF SOME OF THE PREFERRED EMBODIMENTS

These and other needs in the art are addressed in an embodiment by a method for removing contaminant material from industrial equipment, the method comprising: providing a solvent composition comprising methyl soyate, an aprotic solvent (i.e., dimethyl sulfoxide), an additional solvent, and a cationic surfactant; contacting the contaminant material with the solvent composition; and allowing the solvent composition to react with the contaminant material such that at least a portion of the contaminant material is no longer attached to the industrial equipment.

These and other needs in the art are addressed in an embodiment by a solvent composition comprising: methyl soyate, an aprotic solvent (i.e., dimethyl sulfoxide), an additional solvent, and a cationic surfactant.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawing in which the FIGURE illustrates asphalt treated with light cycle oil and 3% of a first solvent composition (the right container in the FIGURE) having methyl soyate, dipropylene glycol, isostearyl ethylimidazolinium ethosulfate, and dimethyl sulfoxide or 3% of a second solvent composition (the left container in the FIGURE) having methyl soyate, dipropylene glycol, isostearyl ethylimidazolinium ethosulfate, and N-methylpyrrolidone for one hour.

DETAILED DESCRIPTION OF THE PREFERRED EMBODIMENTS

In embodiments, a solvent composition comprises a mixture of three solvents and a cationic surfactant. The first solvent is methyl soyate. The second solvent is an aprotic solvent (i.e., dimethyl sulfoxide). The third solvent may be any solvent suitable for maintaining the cationic surfactant in solution (e.g., alcohols, esters, ketones, and the like). Without limitation, the solvent composition may disaggregate and/or dissolve contaminant materials from industrial equipment in industrial facilities (e.g., oil refineries, natural gas processing plants, petrochemical facilities, port terminals, and the like). In embodiments, the solvent composition may be used to remove a contaminant material from any industrial equipment used in industrial facilities including vessels, tanks, vacuum towers, heat exchangers, piping, distillation columns, and the like. In embodiments, contaminant materials to be removed may include any contaminant material produced, stored, transported, or the like during the process of crude oil refinement, natural gas processing, hydrocarbon transport, hydrocarbon processing, hydrocarbon cleanup, and the like. In embodiments, examples of contaminant materials include asphalt, heavy asphaltenic materials, hydrogen-deficient carbonaceous materials, coke, tar, heavy oil deposits, hydrocarbon sludge, lube oil, the like, or any combinations thereof. In embodiments, the contaminant materials are contacted with the solvent composition, such that the contaminant materials are disaggregated and/or dissolved and may then be subsequently removed from industrial equipment.

Embodiments of the solvent composition comprise the solvent methyl soyate (MESO). MESO is a biodegradable long-chain esterified fatty acid. The solvent composition may have any wt. % of MESO suitable for disaggregating and/or dissolving contaminant materials such that at least a portion of a contaminant material may be removed from industrial equipment. For instance, the contaminant material may be removed from the surface of industrial equipment. In an embodiment, the solvent composition has between about 20.0 wt. % MESO and about 40.0 wt. % MESO, alternatively between about 25.0 wt. % MESO and about 35.0 wt. % MESO. In some embodiments, the MESO may comprise about 30.0 wt. % of the solvent composition. With the benefit of this disclosure, one of ordinary skill in the art will be able to select an appropriate amount of MESO for a chosen application.

Embodiments of the solvent composition comprise an aprotic solvent. Aprotic solvents include any solvents that neither donate protons nor accept protons. Aprotic solvents include dimethyl sulfoxide (DMSO), N-methylpyrrolidone (NMP), dimethyl formamide, benzene, or any combinations thereof. In an embodiment, the aprotic solvent is DMSO. In embodiments, the aprotic solvent is DMSO and does not include any or substantially any NMP, benzene, and/or dimethyl formamide. The solvent composition may have any wt. % of aprotic solvent suitable for disaggregating and/or dissolving contaminant materials such that at least a portion of a contaminant material may be removed from industrial equipment. In an embodiment, the solvent composition has between about 20.0 wt. % aprotic solvent (i.e., DMSO) and about 50.0 wt. % aprotic solvent (i.e., DMSO), alternatively between about 25.0 wt. % aprotic solvent (i.e., DMSO) and about 35.0 wt. % aprotic solvent (i.e., DMSO). In some embodiments, the aprotic solvent (i.e., DMSO) may comprise about 32.0 wt. % of the solvent composition. With the benefit of this disclosure, one of ordinary skill in the art will be able to select an appropriate amount of aprotic solvent for a chosen application.

Embodiments of the solvent composition comprise a third solvent (TS). The third solvent may be any solvent, or combination of solvents, suitable for maintaining the cationic surfactant in solution and/or for lowering the surface tension of the solvent composition. Without limitation, the third solvent facilitates the contaminant material removal process. The TS may be an alcohol, an ester, ether, the like, or any combinations thereof. In some embodiments, the alcohol may include dipropylene glycol, propylene glycol, simple alcohols ranging from $C_8$ to $C_{18}$ (e.g., octanol, dodecanol), the like, or any combinations thereof. In some embodiments, the ester may include ethyl acetate, isobutyl acetate, glycol esters (e.g., glycol stearate, monoglycerides such as glyceryl stearate, and the like), the like, or any combinations thereof. In some embodiments, the ether may include a glycol such as dipropylene glycol, or an alkyl glucoside such as decyl glucoside, the like or any combinations thereof. In an embodiment, the TS is dipropylene glycol. In some embodiments, the TS, in addition to maintaining the cationic surfactant in solution, possesses a high boiling point, low toxicity, biodegradability, or any combinations thereof. The solvent composition may have any wt. % of the TS suitable for maintaining the cationic surfactant in solution and/or lowering the surface tension of the solvent composition, which without limitation facilitates the contaminant removal process. In an embodiment, the solvent composition has between about 20.0 wt. % TS and about 40.0 wt. % TS, alternatively between about 25.0 wt. % TS and about 35.0 wt. % TS. In some embodiments, the TS may comprise about 30.0 wt. % of the solvent composition. With the benefit of this disclosure, one of ordinary skill in the art will be able to select an appropriate amount of the TS for a chosen application.

Embodiments of the solvent composition comprise a cationic surfactant. The cationic surfactant may be any cationic surfactant or combination of cationic surfactants suitable for use in the solvent composition. The cationic surfactant may be a quaternary ammonium salt such as an imidazole derivative. Without limitation, specific examples of the cationic surfactant include heterocycles (e.g., isostearyl ethylimidazolinium ethosulfate (ISES), and the like), alkyl-substituted pyridines, morpholinium salts, alkyl ammonium salts (e.g., cetyl trimethylammonium bromide, stearalkonium chloride, dimethyldioctadecylammonim chloride, and the like), the like, or any combinations thereof. In an embodiment, the cationic surfactant is ISES. The solvent composition may have any wt. % of the cationic surfactant for disaggregating and/or dissolving contaminant materials such that at least a portion of a contaminant material may be removed from industrial equipment. In some embodiments, the cationic surfactant may have detergent properties such as disaggregation and emulsification. In an embodiment, the solvent composition has between about 4.0 wt. % cationic surfactant and about 12.0 wt. % cationic surfactant, alternatively between about 6.0 wt. % cationic surfactant and about 10.0 wt. % cationic surfactant. In some embodiments, the cationic surfactant may comprise about 8.0 wt. % of the solvent composition. With the benefit of this disclosure, one of ordinary skill in the art will be able to select an appropriate amount of cationic surfactant for a chosen application.

In optional embodiments, the solvent composition may comprise a dispersant. The dispersant may be any dispersant suitable for preventing the settling of any components in the solvent composition. Examples of suitable dispersants include, without limitation, sulfonated-formaldehyde-based dispersants, polycarboxylated ether dispersants, naphthalene sulfonate dispersants, the like, or any combinations thereof. The solvent composition may have any wt. % of the dispersant suitable for preventing the settling of any of the solvent composition components. In an embodiment, the solvent composition has between about 1 wt. % dispersant and about 10 wt. % dispersant, alternatively between about 2 wt. % dispersant and about 7 wt. % dispersant. In some embodiments, the dispersant may comprise about 3 wt. % of the solvent composition. With the benefit of this disclosure, one of ordinary skill in the art will be able to select an appropriate amount of dispersant for a chosen application.

In embodiments, the solvent composition may be prepared by mixing the MESO, aprotic solvent (i.e., DMSO), and the TS together prior to the addition of the cationic surfactant. Without being limited by theory, mixing the MESO, the aprotic solvent, and the TS prior to the addition of the cationic surfactant may improve mixability. In embodiments, the MESO, aprotic solvent, and the TS may be mixed together in any order. Moreover, once the MESO, aprotic solvent, the TS, and the cationic surfactant have been mixed together to create the solvent composition, the solvent composition may be stored until desired for use. In optional embodiments wherein the solvent composition also comprises a dispersant, the dispersant may be added to the solvent composition at any time during preparation of the solvent composition. The solvent composition may be prepared under any suitable conditions. In embodiments, the solvent composition may be prepared at ambient temperature and pressure.

In optional embodiments, the solvent composition may be diluted with a diluent. In these optional embodiments, the diluent may comprise any suitable diluent that may dilute the solvent composition. In embodiments, the diluent may comprise diesel fuel, biodiesel fuel, fuel oil, heavy aromatic naphtha, light sweet crude oil, water, the like, or any combinations thereof. Without being limited by theory, the diluent may decrease the potency of the solvent composition, but not otherwise affect the efficacy. In optional embodiments, the solvent composition has from about 1 wt. % to about 99 wt. % diluent, alternatively from about 80 wt. % to about 90 wt. % diluent, and further alternatively from about 90 wt. % to about 99 wt. % diluent. In an embodiment, the solvent composition has about 95 wt. % diluent, alternatively about 99 wt. % diluent. With the benefit of this disclosure, one of ordinary skill in the art will be able to select an appropriate amount of diluent for a chosen application.

In embodiments, a contaminant material removal process comprises contacting the contaminant materials and/or the industrial equipment with the solvent composition. For example, in embodiments comprising a vessel containing contaminant materials disposed within the vessel, the solvent composition is introduced into the vessel. The solvent composition may be introduced into the vessel by any suitable means such that the solvent composition contacts the contaminant materials disposed therein. In embodiments, the solvent composition is introduced into the vessel by being poured, pumped, injected, or the like, or any combinations thereof. As another example, in embodiments comprising industrial equipment having contaminant materials disposed thereon, the solvent composition may be poured onto the contaminated portion of the industrial equipment, or the contaminated portion of the industrial equipment may be submerged in the solvent composition such that the solvent composition contacts the contaminant materials disposed thereon.

In optional embodiments, the contaminant material removal process may include the addition of heat to the solvent composition. The heat may be added by any suitable means such as by steam, heated coils, the like, or any combinations thereof. In further optional embodiments, the solvent composition is heated to a temperature between about ambient temperature and the flash point of the diluent. Solvents containing light cycle oil as diluent can be heated between 100° F. and about 160° F., and further alternatively between about 120° F. and about 150° F. The heat may be applied to the solvent composition prior to the solvent composition contacting a contaminant material or concurrently while the solvent composition is contacting a contaminant material. In embodiments, the solvent composition is agitated when disposed in industrial equipment such as a vessel. Without limitation, in these optional embodiments, the heat is added to facilitate the disaggregation and/or dissolution process between the solvent composition and the contaminant materials.

In optional embodiments, the contaminant material removal process may include the addition of agitation to the solvent composition. Agitation of the solvent composition may be accomplished by any suitable means such as by stirring, shaking, pumping, the like, or any combinations thereof. The agitation may be applied to the solvent composition prior to the solvent composition contacting a contaminant material or concurrently while the solvent composition is contacting a contaminant material. Without limitation, in these optional embodiments, the agitation is added to facilitate the disaggregation and/or dissolution process between the solvent composition and the contaminant materials. In further optional embodiments, the solvent composition may be both agitated and heated as described above.

The solvent composition may be disposed in the industrial equipment for any suitable period of time to allow the solvent composition in contact with the contaminant material to remove at least a portion of the contaminant material from the industrial equipment (i.e., disaggregated or dissolved). In embodiments comprising a diluent, the length of the time frame may be dictated by the amount that the solvent composition is diluted. In an embodiment, the time frame is from about one minute to about three weeks. In alternative embodiments, the time frame is from about one hour to about forty-eight hours. In further alternative embodiments, the time frame is from about one hour to about twelve hours.

In embodiments, the solvent composition may be introduced to industrial equipment in amounts to provide sufficient solvent composition to successfully remove at least a portion of the contaminant materials from the surfaces on which the contaminant materials are disposed. In embodiments, this amount is an amount sufficient for the solvent composition to contact the contaminant materials for an amount of time sufficient to disaggregate and/or dissolve the contaminant materials. For instance, the solvent composition may be introduced to industrial equipment in an amount in relation to the contaminant material (i.e., weight ratio of solvent composition to contaminant material) between about 100:1 weight ratio and about a 1:1 weight ratio, alternatively between about a 10:1 weight ratio and about a 1:1 weight ratio. For example, the solvent composition to contaminant material ratio may comprise about a 50:1 weight ratio, alternatively about a 20:1 weight ratio, and further alternatively about a 5:1 weight ratio.

In embodiments, once the contaminant materials have been disaggregated and/or dissolved, the contaminant materials may reside in the solvent composition and may therefore be fluid and/or flowable within the solvent composition. The contaminant materials residing within the solvent composition may be removed from the industrial equipment by any suitable means. In embodiments, the solvent composition is pumped, poured, or the like, or any combinations thereof from the industrial equipment along with the solvent composition.

In optional embodiments, the surface that was contaminated by a contaminant material may be cleaned after the contaminant material has been contacted by the solvent composition. Without limitation, cleaning the surface may remove additional particulates and/or residue of the contaminant material. The cleaning may be accomplished by any suitable methods such as rinsing, spraying, scrubbing, and the like. Rinsing and/or spraying may be accomplished by any suitable method including rinsing and/or spraying with water, aqueous surfactant solutions, hydrocarbon solvents, or any combinations thereof.

In optional embodiments, the contaminant materials may be recovered and/or recycled. The process of recovery and/or recycle may comprise transferring the disaggregated and/or dissolved contaminant materials to a high temperature and high pressure oven (e.g., a coker unit) to "crack" the heavy hydrocarbons into small usable fragments. In embodiments, a catalytic cracker uses high temperature and a catalyst to crack hydrocarbons into smaller pieces. Such a process may reduce contaminant materials to smaller usable hydrocarbons such that they may be recycled for further processing and use.

In some embodiments, the solvent composition may be biodegradable as defined by the Operation for Economic Co-Operation and Development (OECD) Biodegradation Test 301D. An example embodiment of a biodegradable solvent composition includes about 30.0 wt. % MESO, about 32.0 wt. % aprotic solvent (i.e., DMSO), about 30.0 wt. % dipropylene glycol (i.e. the TS), and about 8.0 wt. % ISES (i.e. the cationic surfactant).

In optional embodiments, the solvent composition may be used in conjunction with other products used to treat industrial equipment for contaminant materials or otherwise unwanted materials. For example, the solvent composition may be used to treat contaminant materials concurrently with a sodium nitrite solution used to treat sour water. Examples of sodium nitrite solutions are disclosed in U.S. Pat. No. 8,702,994 issued on Apr. 22, 2014, the entirety of which is incorporated herein by reference. In other optional embodiments, the solvent composition may be used in conjunction with other organic solvents and/or organic solvent additives to dissolve and/or soften contaminant materials and the like. Examples include the organic solvent Rezyd-X®, a registered trademark of United Laboratories International, LLC; the organic solvent additive HOB®, a registered trademark of United Laboratories International, LLC; Zyme-Flow® UN657, a registered trademark of United Laboratories International, LLC; Zyme-Ox® Plus Z50, a registered trademark of United Laboratories International, LLC; the like; or any combinations thereof.

To facilitate a better understanding of the present embodiments, the following examples of certain aspects of some embodiments are given. In no way should the following examples be read to limit, or define, the entire scope of the embodiments.

EXAMPLE 1

A first solvent composition was prepared by mixing the aprotic solvent dimethyl sulfoxide with methyl soyate, dipropylene glycol and isostearyl ethylimidazolinium ethosulfate. A second solvent composition was prepared by mixing N-methylpyrrolidone, methyl soyate, dipropylene glycol and isostearyl ethylimidazolinium ethosulfate. Both compositions have the same proportions.

For performance testing, one of the more difficult samples was chosen, which was a crystallized asphalt from an asphalt tank. Equal-sized chunks of asphalt weighing approximately 2 grams each were placed in sample vials. Light cycle oil (LCO) containing 3% of either the first solvent composition or the second solvent composition was then added to side-by-side vials in an amount that produced a 1:1.5 sample-to-cutter stock ratio. The two vials were placed in a water bath at 120° F. and occasionally swirled. After an hour, the vials were removed and examined for residue by inverting the vials. as shown in the FIGURE, both formulations readily dissolved the asphalt over the same amount of time.

Parallel tests on asphalt deposits demonstrated that the first solvent composition and the second solvent composition have equivalent technical performance. Each was found to provide rapid dissolution of the asphalt (~1 hour) using a cutter stock containing 3% of the respective product in a sample to cutter ratio of 1:1.5 and heated to 120° F.

EXAMPLE 2

The following example was a comparative illustration between a solvent composition and heavy aromatic naphtha (HAN), which is a traditional solvent used to treat some types of contaminant materials.

A solvent composition was prepared with the following mix of components.

TABLE 1

Solvent Composition Makeup

| Component | Wt. % |
|---|---|
| MESO | 30.0 |
| NMP | 32.0 |
| Dipropylene Glycol | 30.0 |
| ISES | 8.0 |

The solvent composition was diluted to a strength of 5% by the addition of diesel fuel. The contaminant material chosen for testing was a piece of asphalt obtained from a refinery tank. Two equal sized portions of the asphalt, each comprising the same weight of 1 g, were added to two clear vials such that the asphalt was affixed to the bottom of the vials. 3 mL of the HAN solution were added to one vial, and 3 ml of the 5% solvent composition in diesel were added to the other vial. This amount was sufficient to completely submerge the asphalt sample in each vial. Both vials were then placed on a hot plate and heated over a three hour period to temperatures ranging from between 155° F. and 175° F. The samples were not stirred or otherwise agitated. After three hours, the samples were removed from the hot plate and a visual inspection was made. The samples were then allowed to cool overnight. A visual inspection of the samples was made the next day after the cooling period of 14 hours. The results are described in Table 2 below.

TABLE 2

Asphalt Treatment Observations

| Sample | Observations after heating | Observations after cooling |
|---|---|---|
| 5% Solvent Composition | No residue | No residue |
| HAN | No residue | Residue present |

The results indicate that although both the solvent composition and HAN solution were effective in removing asphalt from a vial in the presence of heat, only the solvent composition was able to keep the vial surface free from asphalt residue once the heat was removed. Additionally, both solutions were homogeneous fluids when hot. The solvent composition remained so upon cooling, whereas the HAN solution showed some small "clumps" embodied in the liquid upon cooling.

EXAMPLE 3

The following example is to illustrate the effectiveness of the solvent composition with only minimal heating over extended periods of time.

A solvent composition was prepared with the following mix of components.

TABLE 3

Solvent Composition Makeup

| Component | Wt. % |
|---|---|
| MESO | 30.0 |
| NMP | 32.0 |

TABLE 3-continued

| Solvent Composition Makeup | |
|---|---|
| Component | Wt. % |
| Dipropylene Glycol | 30.0 |
| ISES | 8.0 |

The solvent composition was split into two samples. Sample 1 was diluted to a strength of 5% by the addition of biodiesel. Sample 2 was diluted to a strength of 5% by the addition of fuel oil. The contaminant material chosen for testing was a piece of a hydrocarbon deposit obtained from an underground vessel in a refinery. This vessel was submerged such that it would only be possible to apply limited heat and no agitation to any solvent composition pumped within. Two equal sized portions of the hydrocarbon deposit, each comprising the same weight of 2 g, were added to two clear vials such that the hydrocarbon deposit was affixed to the bottom of the vials. 7.5 mL of Sample 1 and 7.5 ml of Sample 2 were added to the separate vials to completely submerge the hydrocarbon deposit in each vial. Both vials were placed on a hot plate and heated for a one week period at a temperature of 100° F. The samples were not stirred or otherwise agitated. The samples were then removed from the hot plate and a visual inspection was made. The results are presented in Table 4 below.

TABLE 4

| 5% Solvent Composition Treatment Observations | |
|---|---|
| Sample | Observation |
| Sample 1 (Biodiesel Diluent) | Some dissolution |
| Sample 2 (Fuel Oil Diluent) | Some dissolution |

The solvent concentrations of both samples were doubled to 10%, and both samples were heated again for another week at 100° F. The results are presented in Table 5 below.

TABLE 5

| 10% Solvent Composition Treatment Observations | |
|---|---|
| Sample | Observation |
| Sample 1 (Biodiesel Diluent) | Continued dissolution |
| Sample 2 (Fuel Oil Diluent) | Continued dissolution |

The solvent concentrations of both samples were doubled again, and both samples were then heated again for a third week at 100° F. The results are presented in Table 6 below.

TABLE 6

| 20% Solvent Composition Treatment Observations | |
|---|---|
| Sample | Observation |
| Sample 1 (Biodiesel Diluent) | Complete dissolution |
| Sample 2 (Fuel Oil Diluent) | Continued dissolution |

The results indicated that the solvent composition continued to work for extended periods of time even when only minimal heat was applied.

EXAMPLE 4

The following example is to illustrate the effectiveness of the solvent composition on various sources of asphalt samples. The first sample was collected from a crude oil distillation unit (CDU) as asphalt flux and the second sample was collected from a propane de-asphalting unit (PDA). The first sample was observed to have a pasty consistency. The second sample was hardened and required a sharp tool to separate for weighing and testing. Two solvents were used in the experiment, Rezyd-X® which is a solvent system available from United Laboratories International, LLC and the solvent of the present application comprising MESO, NMP, dipropylene glycol, and ISES.

The solvents were dissolved in diesel at 1% or 2% by volume. Five to six grams of each asphalt sample was measured and placed in a vial and a measured volume of the dissolved solvent was added. The vials were placed in a water bath at 125° F. with occasional agitation to promote mixing. The results are presented in Table 7.

TABLE 7

| Solvent Effects on Asphalt Samples | | | | |
|---|---|---|---|---|
| Diesel/Asphalt Ratio | Solvent | Vol. % Solvent in Diesel | CDU Flux Sample | PDA Sample |
| 1:1 | Rezyd-X ® | 1% | Partial Dissolution | Partial Dissolution |
| 1:1 | MESO/NMP/dipropylene glycol/ISES | 1% | Partial Dissolution | Partial Dissolution |
| 1:1 | Rezyd-X ® | 2% | Partial Dissolution | Dissolved 90% @ 6 hrs<br>Dissolved 100% @ 12 hrs |
| 1:1 | MESO/NMP/dipropylene glycol/ISES | 2% | Partial Dissolution | Dissolved 100% @ 6 hrs |
| 2:1 | Rezyd-X ® | 1% | 50-75% Dissolved @ 12 hrs | Dissolved 100% @ 12 hrs |
| 2:1 | MESO/NMP/dipropylene glycol/ISES | 1% | 95% Dissolved @ 12 hrs | Dissolved 100% @ 6 hrs |
| 2:1 | Rezyd-X ® | 2% | 100% Dissolved @ 12 hrs | Not Tested |
| 2:1 | MESO/NMP/dipropylene glycol/ISES | 2% | 100% Dissolved @ 12 hrs | Not Tested |

The results indicated that the solvent composition comprising MESO, NMP, Dipropylene Glycol, and ISES completed the dissolution twice as fast at comparable concentrations as Rezyd-X® solvent.

EXAMPLE 5

The following example illustrates the effectiveness of three solvents on dissolution of hardened vacuum tower bottoms (VTB). The solvents tested were Rezyd-X® and HOB® which are both available from United Laboratories International, LLC as well as the solvent of the present application comprising MESO, NMP, dipropylene glycol, and ISES. Each solvent was dissolved in light cycle oil (LCO) at 2% by volume. A sample of VTB was added to three vials and a measured amount of diluted solvent was added to each. The samples were placed in a water bath set at 120° F. Each sample as intermittently agitated to promote mixing. The results of the experiment are presented in Table 8.

An aqueous boilout test was performed with the same vacuum tower bottoms as in the previous test. A sample of VTB was mixed with an aliquot of water and a measured volume solvent comprising MESO, NMP, Dipropylene Glycol, and ISES. The samples were placed in a water bath at 180° F. The first test comprised a 3% by volume solution of solvent in water. There was no observable dissolution after several hours. A second test comprised a 6% by volume solution of solvent in water. There was no observable dissolution after several hours.

TABLE 8

Solvent effects on vacuum tower bottoms samples.

| LCO/ VTB ratio | Solvent | Vol % dissolved in solvent | VTB Sample |
|---|---|---|---|
| 1:1 | Rezyd-X ® | 2% | Significant undissolved residue @ 1 hr<br>Small amounts of residue @ 4 hrs |
| 1:1 | HOB ® | 2% | Significant undissolved residue @ 1 hr<br>Small amounts of residue @ 4 hrs |
| 1:1 | MESO/NMP/ dipropylene glycol/ISES | 2% | Dissolved 100% @ 1 hr. No residue in vial. |
| 1:1 | MESO/NMP/ dipropylene glycol/ISES | 4.5% | Dissolved 100% @ 12 minutes. No residue in vial. |

The results indicated that the solvent composition comprising MESO, NMP, dipropylene glycol, and ISES completed the dissolution at least four times as fast at comparable concentrations as Rezyd-X® and HOB® solvent. A second experiment was performed where the concentration of solvent comprising MESO, NMP, dipropylene glycol, and ISES was increased to 4.5% by volume. The rate of dissolution decreased to 12 minutes for the same mass of VTB as the test with 2% by volume.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method for removing contaminant material from oil and gas industrial refinement equipment, the method comprising:

(A) providing a solvent composition comprising methyl soyate, an aprotic solvent, an additional solvent, a dilent comprising diesel fuel, biodiesel fuel, fuel oil, heavy aromatic naphtha, sweet crude oil, or combinations thereof, a sodium nitrite solution, and a cationic surfactant, wherein the additional solvent is suitable for maintaining the cationic surfactant in solution, and wherein the additional solvent comprises dipropylene glycol wherein the methyl soyate, the aprotic solvent, and the additional solvent are mixed together prior to addition of the cationic surfactant;

(B) contacting the contaminant material on oil and gas industrial refinement equipment with the solvent composition, wherein the contaminant material comprises at least one material selected from the group consisting of asphalt, heavy asphaltenic materials, hydrogen-deficient carbonaceous materials, coke, tar, heavy oil deposits, hydrocarbon sludge, lube oil, or any combination thereof; and (C) allowing the solvent composition to react with the contaminant material such that at least a portion of the contaminant material is no longer attached to the industrial equipment;

(D) further comprising the solvent composition contacting the industrial equipment; additionally comprising the solvent composition dissolving at least a portion of the contaminant material such that at least a portion of the contaminant material is dissolved within the solvent composition; and further comprising removing the solvent composition comprising the dissolved contaminant material from further contact with the industrial equipment.

2. The method of claim 1, wherein the aprotic solvent comprises dimethyl sulfoxide.

3. The method of claim 1, wherein the solvent composition comprises between about 20.0 wt. % and about 40.0 wt. % methyl soyate.

4. The method of claim 1, wherein the solvent composition comprises between about 20.0 wt. % and about 50.0 wt. % aprotic solvent.

5. The method of claim 1, wherein the solvent composition comprises between about 20.0 wt. % and about 40.0 wt. % additional solvent.

6. The method of claim 1, wherein the solvent composition comprises between about 4.0 wt. % and about 12.0 wt. % cationic surfactant.

7. The method of claim 1, wherein the solvent composition further comprises a dispersant, wherein the dispersant comprises between 1.0 wt % and 10.0 wt % of the solvent composition.

8. The method of claim 1, wherein the cationic surfactant comprises a quaternary ammonium salt.

9. The method of claim 1, wherein the cationic surfactant comprises isostearyl ethylimidazolinium ethosulfate.

10. The method of claim 1, wherein the diluent is diesel fuel.

11. The method of claim 1, wherein the solvent composition is heated to temperature between about 100° F. and about 160° F.

* * * * *